March 15, 1932.　　　　L. SEKULSKI　　　　1,849,385
CONVEYING APPARATUS
Filed Oct. 24, 1928　　　　4 Sheets-Sheet 1

INVENTOR
LEE SEKULSKI
ATTORNEYS

March 15, 1932.　　　L. SEKULSKI　　　1,849,385
CONVEYING APPARATUS
Filed Oct. 24, 1928　　　4 Sheets-Sheet 2

INVENTOR
LEE SEKULSKI
ATTORNEYS

March 15, 1932.　　　L. SEKULSKI　　　1,849,385

CONVEYING APPARATUS

Filed Oct. 24, 1928　　　4 Sheets-Sheet 3

INVENTOR
LEE SEKULSKI

ATTORNEYS

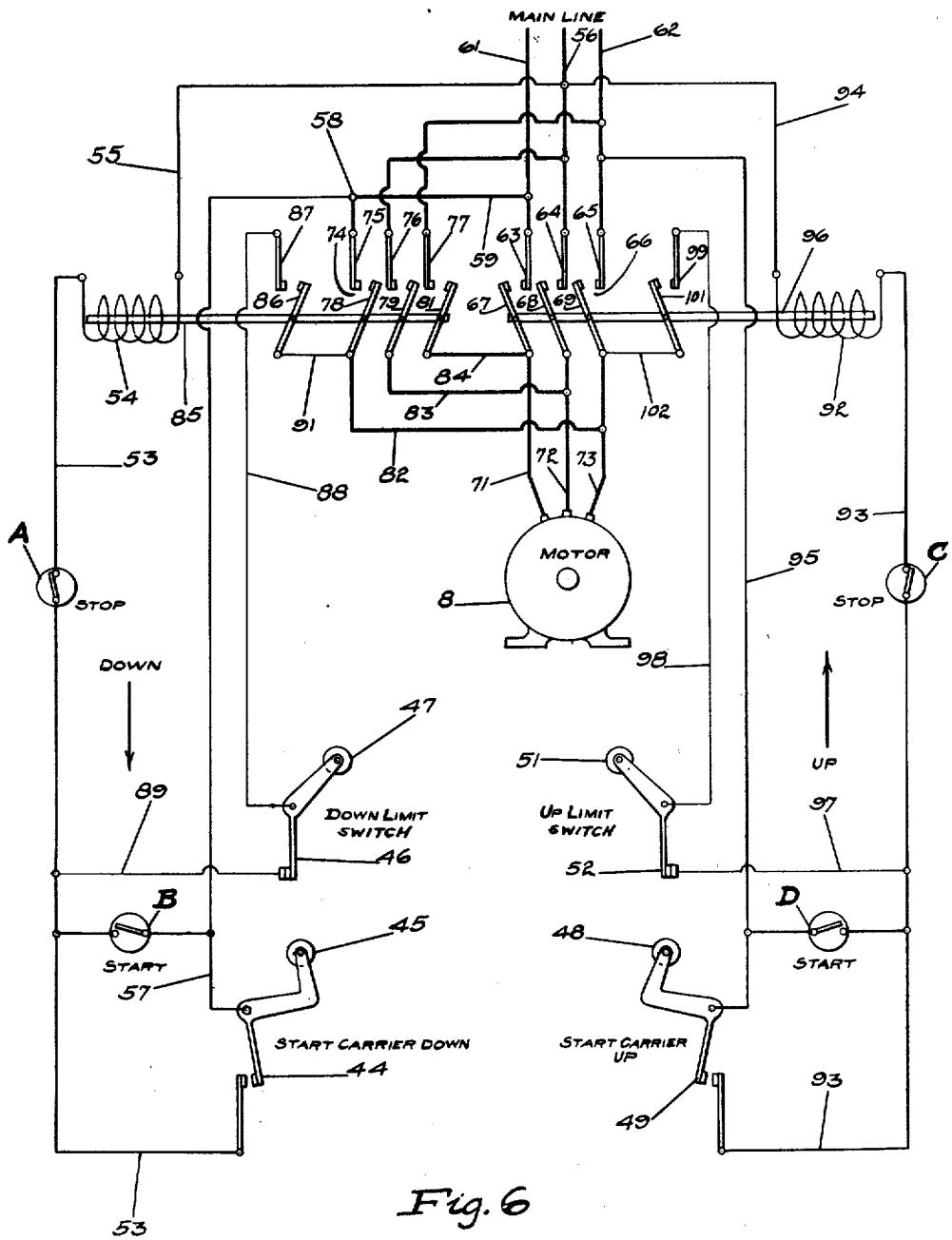

Patented Mar. 15, 1932

1,849,385

UNITED STATES PATENT OFFICE

LEE SEKULSKI, OF ELLWOOD CITY, PENNSYLVANIA, ASSIGNOR TO MATTHEWS CONVEYER COMPANY, OF ELLWOOD CITY, PENNSYLVANIA, A CORPORATION OF PENNSYLVANIA

CONVEYING APPARATUS

Application filed October 24, 1928. Serial No. 314,723.

This invention relates to new and useful improvements in conveying apparatus, and more particularly, to an elevator or hoist adapted for automatic operation.

An object of the invention is to provide an elevator having a conveyer connected therewith and adapted to deliver articles thereto, and having means at its upper end for receiving articles from the elevator, and further, having means positioned to be engaged by the article being discharged from the elevator and to cause another article to be delivered onto the elevator, when the latter reaches its loading position.

A further object of the invention is to provide a conveying apparatus comprising a carrier adapted to convey articles from one elevation to another and having a gravity conveyer connected therewith and adapted to deliver articles thereto, and an article stop-mechanism being provided for controlling the delivery of articles to the carrier, said mechanism being operable by the discharge of an article from the carrier to actuate said stop-mechanism to position an article to be received by the carrier, when the latter reaches its loading position.

A further object is to provide an apparatus of the class described, comprising a carrier adapted to convey articles from one elevation to another, and having a conveyer adapted to deliver articles to the carrier and one for conveying articles therefrom, and the driving means for the carrier operating mechanism being associated with and operable by movement of the carrier and articles to control operation of said driving means.

A further object is to provide an automatic elevator or hoist comprising a vertically movable carrier operable by a reversible motor, and having a conveyer connected therewith and provided with a vertically movable roller section, adapted to receive articles from the conveyer, said roller section being adapted to be operated by movement of the carrier, when the latter reaches the limit of its downward movement, to deliver an article onto the carrier, and a switch being arranged at the lower end of the elevator frame adapted to be engaged by the article passing onto the carrier, whereby the motor will operate to lift the carrier, until it engages a limit switch, positioned adjacent to a receiving conveyer connected with the elevator, whereupon the carrier will stop and the article carried thereby will be discharged onto said receiving conveyer and will engage means mounted thereon which will cause the motor to operate to lower the carrier to its load-receiving position, where it will again actuate the vertically movable roller conveyer section to cause the latter to deliver another load into the carrier.

A further object is to provide an apparatus comprising an elevator shaft having two or more conveyers connected therewith and located at different levels, and a carriage or elevator being mounted in said elevator shaft and adapted to transport articles from one conveyer to another, and control devices being positioned to be actuated by the carriage and an article positioned thereon to control the delivery of an article or articles onto said carriage from one of said conveyers, and the discharge of the article or articles therefrom onto another conveyer.

A further object is to provide an automatic elevator or hoist comprising a single carrier adapted for vertical movement between two conveyers or stations, and a vertically movable conveyer section being provided at the receiving end of the elevator which is operable by movement of the carrier, to temporarily interrupt the movement of articles to be delivered to the carrier, and to cause said articles to be delivered thereto, one at a time, thereby automatically avoiding congestion or blocking of the articles at the loading point, and means being provided at the other end of the elevator adapted to interrupt the movement of the carrier and to cause articles supported thereon to be discharged onto a receiving conveyer or station, after which the carrier will be returned to the loading station to receive another load.

Other objects of the invention reside in the arrangement of the switches for automatically controlling the operation of the carrier-operating mechanism; in the means provided for delivering the articles onto the carrier at the receiving end of the elevator; in the means provided at one end of the elevator adapted to be actuated by an article or load discharged from the carrier, to cause the vertically movable section at the opposite or receiving end of the elevator, to be moved to a load-receiving position; and, in the general arrangement and construction of the apparatus as a whole.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 6 is a wiring diagram diagrammatically illustrating the connections between the various switches and the main line and motor.

Figures 1, 5:
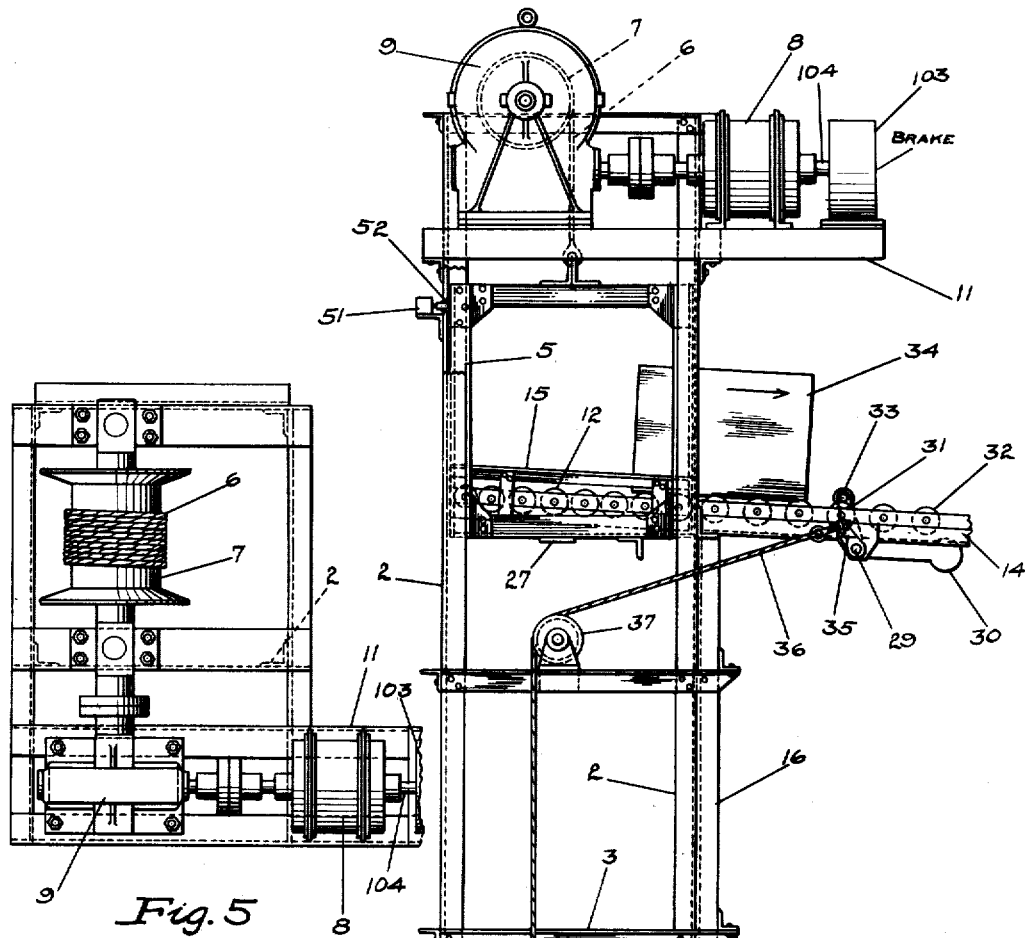
Figure 1 is a side elevation, showing the elevator frame with the carrier positioned in the upper portion thereof and discharging a load.
Figure 5 is a plan view of the carrier operating mechanism.
Figure 2:
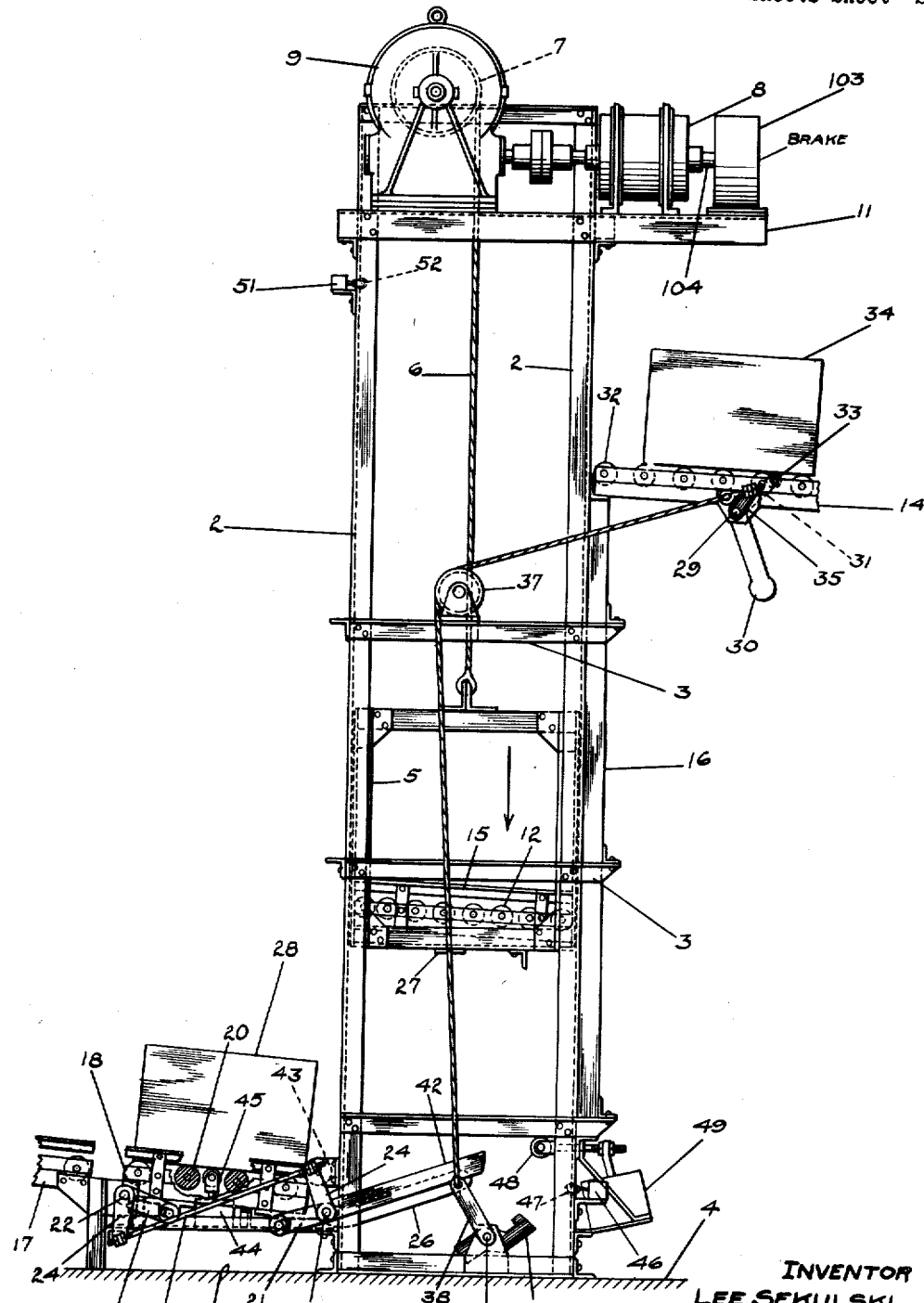
Figure 2 is a view similar to Figure 1, showing the position of the parts during downward movement of the carrier.

The novel apparatus featured in this invention comprises an upright frame 2 suitably braced by means of horizontal members 3, as shown in Figures 1 and 2. The frame 2 is supported upon a suitable base or foundation indicated at 4.

Figure 3:
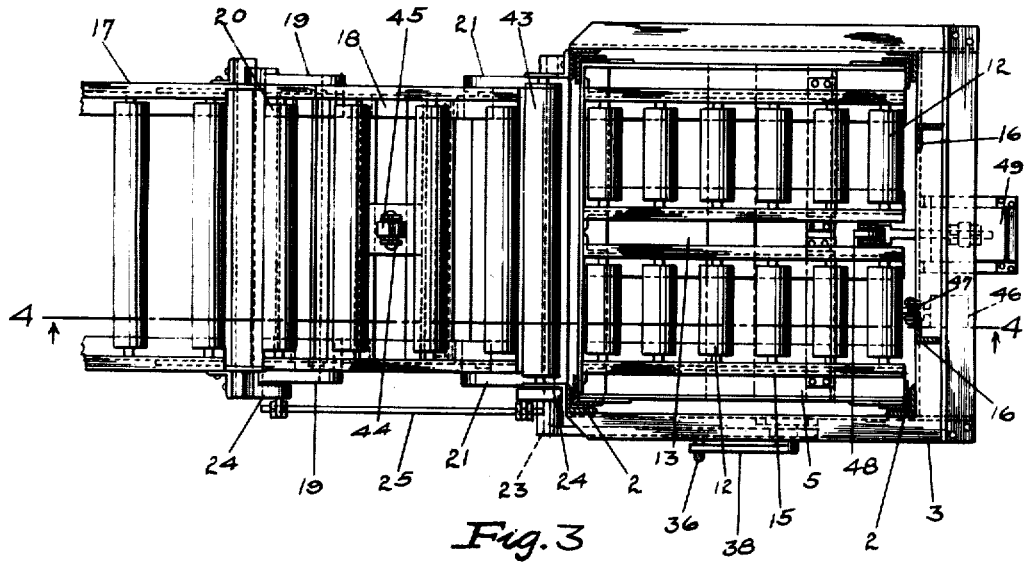
Figure 3 is a sectional plan view on the lines 3—3 of Figures 1 and 4.

A carrier 5 is movably mounted in the frame 2, and has one end of a cable 6 connected thereto, the other end of which is operatively connected with a winding drum 7, operable by means of a motor 8, through a suitable reduction gear or transmission 9, shown more clearly in Figures 1 and 5. The winding drum 7, motor 8, and transmission 9 are supported upon a suitable frame structure 11, supported upon the upright frame 2. The bottom of the carrier comprises antifriction rollers 12, arranged as shown in Figure 3, so as to provide a a gap 13. These gravity rollers 12 are arranged at a slight incline so that when a load is positioned thereon, and the carrier reaches the receiving conveyer 14, provided at the upper end thereof, the load or article will travel by gravity from the carrier onto the conveyer 14, which preferably is of the gravity roller type, as shown. Suitable side rails 15 are provided upon the carrier, and upright guide rails 16 are provided on the upright frame 2. These rails retain the load or article upon the carrier during its upward movement. When the carrier reaches the position shown in Figure 1, the load will automatically be discharged onto the gravity carrier 14.

Figure 4:
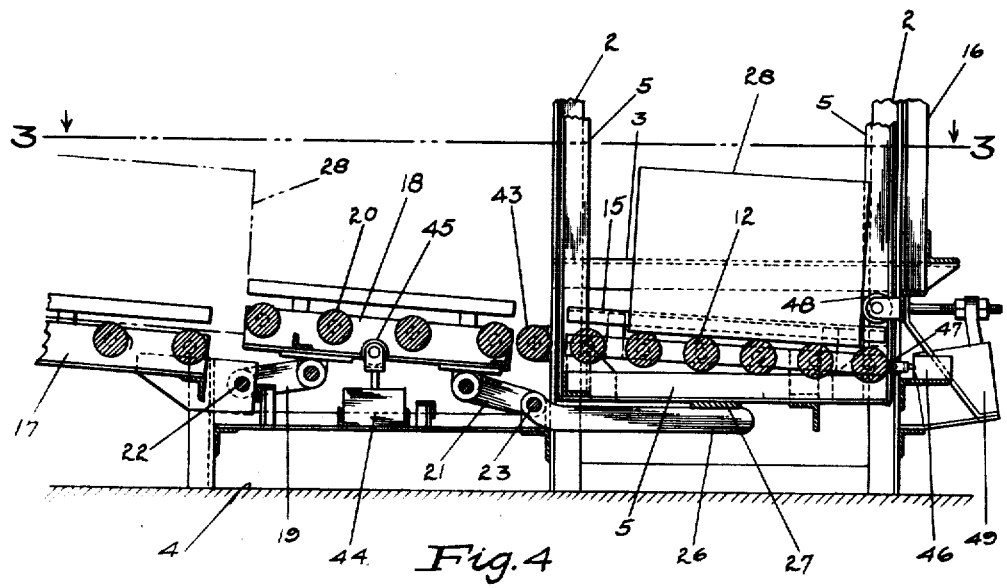
Figure 4 is an enlarged detail sectional view on the line 4—4 of Figure 3, showing the carrier in its lowermost or load-receiving position.

The means provided for automatically loading the carrier, each time it reaches the limit of its downward movement is shown in Figures 1, 2 and 4. The articles to be elevated are here shown as being delivered to the carrier by a conveyer 17. A vertically movable section 18 is provided between the end of the conveyer 17 and the elevator frame 2. This movable section comprises a plurality of gravity rollers 20 which permit the load to be discharged therefrom by gravity onto the carrier, when the carrier reaches the position shown in Figure 4 and the movable section 18 is in the position shown in this same figure. The movable section 18 is supported upon arms 19 and 21, secured to shafts 22 and 23 respectively. An arm 24 is secured to each shaft 22 and 23 and have a connection 25 connecting them together so as to cause the arms 19 and 21, when actuated, to operate synchronously and in the same direction, whereby the section 18 may be moved up and down and substantially in parallel relation to the conveyer 17.

An arm 26 is also secured to the shaft 23 and is positioned to be engaged by a cross member 27, secured to the bottom of the carrier 5, as shown in Figure 4. When this arm is moved from the position shown in Figure 2 to that shown in Figure 4, the movable section 18 will be elevated so that the rollers thereof will be aligned substantially with the rollers of the carrier, whereupon the load or article supported upon the section 18 will be conveyed by gravity onto the carriage 5, as shown in Figure 4. When the section 18 is thus elevated, it provides a stop for the next following box or article, indicated by the numeral 28 in Figures 1 and 4. During upward movement of the carrier, from the position shown in Figure 4 to that shown in Figure 1, the movable section 18 will remain in the position shown in Figures 1 and 4, thereby preventing the next following article from being delivered into the elevator shaft or frame 2.

Means are provided at the upper end of the elevator shaft at the receiving conveyer 14, for lowering the movable section 18 to its load-receiving position, shown in Figure 2. A cross shaft 29 is mounted on the conveyer 14 and has an arm 31 extending upwardly through the conveyer to a position above the upper portions of the gravity rollers 32 of the conveyer 14. as shown in Figure 1. The gravity rollers 32 are preferably arranged in two groups in a manner similar to the rollers 12 of the carrier 5, so that a space is provided therebetween for the arm 31. An anti-friction roller 33 is preferably mounted upon the upper end of the arm 31, in position to be engaged by an article 34, when the latter is delivered onto the conveyer 14.

A short arm 35 is also secured to the shaft 29, and has one end of a cable 36 connected therewith which passes over a sheave 37, and has its lower end connected with an arm 38 secured to a shaft 39. A counterweight 30 is secured to the shaft 29, and normally tends to swing the arms 31 and 35 in the direction of travel of the articles over the conveyer 14. A dog 41 is also secured to the shaft 39 and is adapted to engage one end of an arm 42 secured to the shaft 23. Figure 1 shows the arm 42 engaged with the dog 41. These parts retain the movable section 18 in its elevated position, shown in Figures 1 and 4. When the article 34 engages the roller 33, the arm 31 will be oscillated to exert a pull upon the cable 36, causing the dog 41 to be moved out of locking engagement with the arm 42, whereupon the movable section 18 will assume its normal lowered position, shown in Figure 2. As soon as the section 18 is moved to the position shown in Figure 2, the article or box 28, which heretofore was held back by engaging one end of the section 18, will be delivered onto the section 18 by gravity, and will engage a stop roller 43 mounted upon the frame 2, as shown in Figure 4. This roller 43 is not adapted for vertical movement but is so arranged that when the section 18 and carrier 5 are in the positions shown in Figure 4, the roller 43 will be aligned substantially with the rollers provided upon the section 18 and carrier 5. In the drawings, I have shown the cable 36 connecting the arms 35 and 38, but it is to be understood that in place of this cable, a rod may be used, if desired.

The means provided for controlling the operation of the carrier-operating mechanism, provided at the upper end of the frame 2, is here shown as consisting of a series of switches electrically associated with the motor 8 and adapted to be engaged by the carrier and articles. 44 indicates a switch having a roller 45 positioned to be engaged by the load or article, when the conveyer section 18 is lowered from the position shown in Figure 1 to that shown in Figure 2. When this switch is closed, the motor will operate to lower the carrier from the position shown in Figure 1 to that shown in Figure 4. A stop switch 46 is provided at the lower end of the frame 2, and has a roller 47 adapted to be engaged by the empty carrier, whereby the circuit to the motor, through the switch 44 will be opened, whereupon the carrier 5 will come to rest in the position shown in Figure 4.

The article is then delievered onto the carrier as shown in Figure 4, and engages a roller 48 connected with a switch 49. When the roller 48 is engaged by the article or load, a circuit will be closed to the motor which will cause the latter to rotate in the reverse direction to elevate the carrier from the position shown in Figure 4 to that shown in Figure 1. A stop watch 51 is also provided at the upper end of the frame 2 for limiting the upward movement of the carrier. This switch has a roller 52 positioned in the path of the carrier so that when the latter reaches the position shown in Figure 1, the roller will be engaged by the carrier and the switch 51 opened, which, in turn, will cause the circuit to the motor through the switch 49 to be opened, causing the carrier to come to rest, and thus permitting the article or load 34 to be delivered onto the receiving conveyer 14, as shown in Figure 1, and, as hereinbefore described.

To afford a clearer explanation of the operation of the switches, reference may be had to the wiring diagram shown in Figure 6. In this figure, it will be noted that the switch 44 has a wire 53 connecting it with one end of a relay coil 54, the other end of which is connected by a wire 55 to the conductor 56 of the main line circuit. A wire 57 connects the other side of the switch 44 with a terminal 58, having a connection 59 with the main line wire or conductor 61.

The main line wires 61, 56 and 62 are connected respectively with contacts 63, 64, and 65 of a motor switch 66. The movable contacts 67, 68, and 69 of the switch 66, are adapted to be moved into electrical contact with the stationary contacts 63, 64, and 65 to start the motor in one direction. The movable contacts 67, 68 and 69 are connected by wires 71, 72, and 73 to the motor 8, as shown. A similar switch 74 has stationary contacts 75, 76, and 77 adapted to be engaged by movable contacts 78, 79 and 81, respectively. These movable contacts are connected by wires 82, 83, and 84 to the wires 71, 72, and 73, respectively, as shown.

When the circuit to the relay 54 is closed, because of an article engaging the roller 45, the switch 74 will be moved into circuit-closing position as a result of the armature 85 of the relay coil 54 being attracted thereby and moved in a direction to close the switch 74. Such closing of the switch 74 will start the motor to rotate in a direction to cause the carrier 5 to move downwardly from the position shown in Figure 1 to that shown in Figure 4. Closing of the motor switch 74 will also cause a movable contact 86 to move into electrical connection with a stationary contact 87 thereby closing a holding circuit comprising wires 88, 89, and the stop switch 46. The stop switch 46 is normally in closed position, as shown, so that when the contact 86 is moved into electrical connection with the contact 87, which occurs before the carrier moves out of engagement with the roller 45, current will flow through the holding circuit with the result that the relay 54 will remain energized until the carrier engages the roller 47 and opens the switch 46, of the above described holding circuit, whereupon the motor switch 74 will immediately be opened to interrupt the motor. The motor switches 66 and 74 are normally held in open positions by gravity or suitable tension means. Such opening of the motor switch will also cause the movable contact 86 to be moved out of electrical connection with the fixed contact 87. The contact 86 has a wire 91 connecting it with the movable contact 78 of the switch 74 so that when in circuit-closing position, current will flow through the wire 59, contacts 75 and 78, wire 91, contacts 86 and 87, wire 88, switch 46, wires 89 and 53, relay coil 54, and thence through the wire 55 to the main line conductor 56, thereby completing the circuit.

The switches 49 and 52 are operated in a manner similar to the switches 44 and 46. When the load or article is delivered onto the carrier 5, the forward end thereof will engage the roller 48 and close the switch 49, whereupon a relay coil 92 will be energized, because of its connection with the switch 49 by means of the wire 93 and the wire 94 connecting the other end thereof with the main line conductor 56. The other side of the switch 49 has a wire 95 connecting it with the main line conductor 62, thereby completing the circuit to the relay coil 92, when the switch 49 is closed. Such energization of the coil 92 will cause the armature 96 of the motor switch 66 to be moved in a direction to cause the switch 66 to be moved into circuit-closing position, thereby causing the motor to be rotated in a direction to elevate the carrier 5.

The stop switch 52 has a wire 97 connecting it with the wire 93 of the relay circuit, and has a second wire 98 connecting it with a contact 99, adapted to be engaged by a movable contact 101, connected with the armature 96 and having a wire 102 electrically connecting it with the conductor 73, leading to the motor. The wires 97 and 98, switch 52, and contacts 99 and 101, provide a holding circuit for retaining the relay 92 energized, after the load is moved out of engagement with the roller 48, which permits the switch 49 to open. As soon, however, as the upper corner of the carrier engages the roller 51 of the stop switch 52, this holding circuit will be automatically opened, causing the relay 92 to become de-energized with the result that the switch 66 will be opened to interrupt the motor. The motor is preferably provided with a solenoid brake, not shown, operable in conjunction with the above described circuits so that when the motor switches 66 and 74 are opened, the motor will immediately cease to function.

The switches 44 and 49 are normally in open position, as shown in Figure 6, while the switches 46 and 52 are normally in closed position. It will also be noted that the rollers 45 and 48 of the switches 44 and 49, respectively, are actuated by the load or article to be conveyed, while the stop switches 46 and 52 are actuated by movement of the carrier 5.

In the wiring diagram, I have also shown four switches marked A, B, C, and D. These switches are for manual operation as, for example, should it be desired to interrupt the carrier before it reaches the limit of its upward movement, then the switch C may be opened, causing the relay to become de-energized, with the result that the motor switch 66 will be opened. The carrier may be started by closing the switch D which, it will be noted, closes a circuit through the relay 92 because of the wires 94 and 95 always being in electrical connection with the main line conductors 56 and 62. The switch D is normally in open position, while the switch C is normally in closed position. These switches are preferably of the push button type.

The switches A and B are in the circuits controlling downward movement of the carrier, and, are similar to the switches C and D, provided in the circuits controlling upward movement of the carrier. These four switches are not used when the apparatus is functioning normally or automatically.

To prevent the motor 8 from over-running each time the carrier or elevator 5 is stopped, a suitable magnetic brake 103 is operatively connected with the shaft extension 104 of the motor, and is electrically associated with the motor control circuits, above described. The brake is of ordinary well-known construction, and it is therefore thought unnecessary to show and describe same in detail.

The electrical switches used in connection with this automatic hoisting apparatus are of ordinary well known construction, but their arrangement in connection with the carrier and articles, and the manner in which they are actuated, is believed to be novel. In actual practice, the push button switches A, B, C, and D are preferably mounted as a unit, for convenience in operation. It may also be possible to connect the circuits in such a manner that manual operation of the carrier may be controlled by an ordinary three-way switch, but, for the sake of clarity, the manual control is shown as comprising four switches of the push button type, located in their respective circuits, and in such a manner that the movement of the carrier is under complete manual control of the operator, when it is desired or becomes necessary to manually control the operation of the carrier.

I claim as my invention:

1. An apparatus of the class described, comprising a carrier adapted to convey articles from one elevation to another, a conveyer adapted to deliver articles to said carrier, means made operable by the discharge of an article from the carrier to cause an article to be positioned for delivery onto the carrier, and means operable by movement of the carrier to cause said positioned article to be delivered thereto.

2. An apparatus of the class described, comprising a carrier adapted to convey articles from one elevation to another, a conveyer adapted to deliver articles to said carrier, a station adapted to receive articles from the carrier, means at said station adapted to be actuated by an article delivered thereto whereby another article may be positioned for delivery onto the carrier, and means operable by movement of the carrier to cause said positioned article to be delivered thereto.

3. An apparatus of the class described, comprising a carrier adapted to convey articles from one elevation to another, a conveyer adapted to deliver articles to said carrier, a conveyer for receiving articles from the carrier, a stop-mechanism for controlling the delivery of articles to the carrier, and means operable by movement of an article discharged from the carrier, to actuate said stop-mechanism and cause an article to be positioned for delivery onto said carrier.

4. An apparatus of the class described, comprising a carrier adapted to convey articles from one elevation to another, a conveyer adapted to deliver articles to said carrier, a conveyer for receiving articles from the carrier, a stop-mechanism for controlling the delivery of articles to the carrier, means operable by movement of an article discharged from the carrier, to actuate said stop-mechanism to cause an article to be positioned for delivery onto said carrier, and means actuable by an article delivered onto the carrier to cause said carrier to be started in one direction.

5. An apparatus of the class described, comprising a vertically movable carrier, a conveyer for delivering articles to said carrier, a conveyer for receiving articles therefrom, a driving means for the carrier, means at the delivery conveyer adapted to be engaged by an article and to cause said driving means to lower the carrier, and means associated with said driving means and positioned to be engaged by an article passing onto the carrier, whereby said driving means is operated to lift the loaded carrier.

6. An apparatus of the class described, comprising a vertically movable carrier, means for delivering articles to said carrier, one at a time, means for receiving articles from said carrier, a driving mechanism for the carrier, means at the point of delivery to the carrier adapted to be engaged by an article and to cause said driving means to lower the carrier, means adapted to be engaged by the carrier in its downward travel and to cause an article to be delivered onto the carrier, and means associated with said driving means and positioned to be engaged by an article passing onto the carrier and to cause said driving means to lift the loaded carrier.

7. An apparatus of the class described, comprising an upright frame, a carrier movable therein, a conveyer for delivering articles to said carrier, a conveyer for receiving articles from the carrier, a movable conveyer section at the receiving end of said frame over which the articles pass from the delivery conveyer onto said carrier, said movable section, when in its lower position, being adapted to receive and temporarily support an article, and when in its upper position, preventing following articles from being delivered to the carrier, means for retaining said movable conveyer section in its upper position, means at the receiving conveyer adapted to be engaged by an article being discharged from said carrier and to cause said retaining means to be actuated to release said movable section whereby said section may descend to load-receiving position, and means positioned to be engaged by the carrier when traveling downwardly, whereby said movable section will be moved to a position to deliver a load onto said carrier.

8. An apparatus of the class described, comprising an upright frame, a carrier movable therein, a conveyer for delivering articles to said carrier, means for receiving articles from the carrier, a movable conveyer section at the receiving end of said frame over which the articles pass from the delivery conveyer onto said carrier, said movable section, when in its lower position, being adapted to receive and temporarily support an article, and when in its upper position, preventing articles from being delivered to the carrier, means for locking said movable section in raised position during upward travel of the carrier, means at the receiving conveyer adapted to be engaged by an article being discharged from the carrier and to release said locking means to permit said movable section to descend to a load-receiving position, and a lever associated with said movable section and positioned to be engaged by the carrier, when the latter approaches the limit of its downward movement, whereby said movable section will be moved to a position to deliver a load onto said carrier.

9. An apparatus of the class described, comprising an elevator shaft having a carrier movable therein, a conveyer for delivering articles to said carrier, means for receiving articles from the carrier, a movable conveyer section located at the receiving end of the shaft and over which articles pass from the delivery conveyer onto said carrier, an arm positioned to be engaged by the carrier when at the bottom of said shaft and to cause said movable section to be raised to discharge a load onto said carrier, means for locking said movable section in load-discharging position during upward travel of the loaded carrier and whereby said movable section operates to prevent following articles from being delivered into said elevator shaft, and means at the receiving conveyer adapted to be engaged by an article being discharged from said carrier to cause the release of said locking means, whereupon said movable section will descend to its normal load-receiving position.

10. An apparatus of the class described, comprising an elevator shaft having a carrier movably mounted therein, a conveyer for delivering articles to said carrier, means for receiving articles from the carrier, a movable conveyer section interposed between said delivery conveyer and said elevator shaft and over which articles pass from the delivery conveyer onto said carrier, an arm associated with said conveyer section and positioned to be engaged by the carrier, when the latter reaches the bottom of said shaft, and whereby said movable section is raised to discharge a load onto said carrier, an arm connected with said movable section, a dog adapted to engage said arm and to lock said movable section in raised position during upward travel of the carrier, and whereby said movable section will operate to prevent following articles from being delivered into said elevator shaft, a trip lever mounted in the receiving conveyer, operatively connected with said movable section and adapted to be engaged by an article being discharged from said carrier whereby said dog is operated to release said arm and to permit said movable section to descend to its normal load-receiving position.

11. An apparatus of the class described, comprising an elevator shaft having a carrier movably mounted therein, a conveyer connected with the lower end of the shaft and adapted to deliver articles thereto, a conveyer connected with the upper portion of the shaft and adapted to receive articles from the carrier, a driving mechanism for the carrier including a reversible motor, switches located at the receiving end of the elevator, one of said switches being adapted to be engaged by an article and to cause said motor to operate to lower the carrier to receive a load, and a second switch being positioned to be engaged by an article delivered onto said carrier and to cause said motor to operate to elevate the loaded carrier, and means for temporarily interrupting operation of the motor, when the carrier reaches each end of its movement, to permit loading and unloading of the carrier.

12. An apparatus of the class described, comprising a carrier adapted to convey articles from one elevation to another, a conveyer for delivering articles to said carrier, a conveyer for receiving articles therefrom, a driving means for the carrier, means for controlling the delivery of articles onto the carrier, means at the delivery conveyer adapted to be engaged by an article whereby said driving means will operate to move the carrier in one direction, and means operatively connected with said driving means and positioned to be engaged by an article passing onto the carrier, whereby said driving means will operate and cause said carrier to move in the opposite direction.

13. An apparatus of the class described, comprising an elevator shaft, a carrier mounted for up-and-down movement therein, means for delivering articles to said carrier, means for receiving articles from the carrier, a driving means for the carrier, means at one end of the elevator shaft positioned to be engaged by an article delivered onto the carrier, whereby said driving means will operate and cause said carrier to move upwardly and means made operable by an article discharging from the carrier to cause an approaching article to actuate mechanism whereby said driving means will operate to lower the carrier.

14. An apparatus of the class described, comprising a loading station and an unloading stations, a carrier adapted to convey articles between said stations, means actuatable by the carrier, when it approaches the loading station, to cause an article to be delivered thereto, means made operable by the article passing onto the carrier to cause the carrier to move to the unloading station, and means at the unloading station adapted to be operated by the article discharging from the carrier whereby an article at the loading station may be positioned for delivery onto the carrier, actuation of said last-mentioned means also causing mechanism to be operated to return the carrier to the loading station to receive a load.

15. An apparatus of the class described, comprising an elevator having a single carrier mounted therein and adapted to convey articles from one elevation to another, a conveyer adapted to deliver articles to said carrier, an article stop means between the carrier and elevator, means made operable by downward movement of the carrier to cause an article to be delivered from said stop means onto said carrier, and means automatically operable to cause the discharge of an article form the carrier at another elevation.

16. An aparatus of the class described, comprising an elevator having a carrier mounted for up and down movement therein over the same path and adapted to convey articles from one elevation to another, a conveyer adapted to deliver articles to said carrier, an article stop means between the conveyer and elevator means made operable by downward movement of the carrier to cause an article to be delivered from said stop means onto said carrier, and means automatically operable to interrupt travel of the carrier at a predetermined point and cause the discharge of an article therefrom.

In witness whereof, I have hereunto set my hand this tenth day of October, 1928.

LEE SEKULSKI.

CERTIFICATE OF CORRECTION.

Patent No. 1,849,385.                                    March 15, 1932.

LEE SEKULSKI.

It is hereby certified that the name of the assignee in the above numbered patent was erroneously written and printed as "Matthews Conveyer Company" whereas said name should have been written and printed as "Mathews Conveyer Company" as shown by the records of assignments in this office; and that the said Letters Patent should be read with this correction therein that the same may conform to the record of the case in the Patent Office.

Signed and sealed this 7th day of February, A. D. 1933.

M. J. Moore,
Acting Commissioner of Patents.

(Seal)

veyer adapted to deliver articles to said carrier, an article stop means between the conveyer and elevator means made operable by downward movement of the carrier to cause an article to be delivered from said stop means onto said carrier, and means automatically operable to interrupt travel of the carrier at a predetermined point and cause the discharge of an article therefrom.

In witness whereof, I have hereunto set my hand this tenth day of October, 1928.

LEE SEKULSKI.

CERTIFICATE OF CORRECTION.

Patent No. 1,849,385.        March 15, 1932.

LEE SEKULSKI.

It is hereby certified that the name of the assignee in the above numbered patent was erroneously written and printed as "Matthews Conveyer Company" whereas said name should have been written and printed as "Mathews Conveyer Company" as shown by the records of assignments in this office; and that the said Letters Patent should be read with this correction therein that the same may conform to the record of the case in the Patent Office.

Signed and sealed this 7th day of February, A. D. 1933.

(Seal)
            M. J. Moore,
          Acting Commissioner of Patents.

CERTIFICATE OF CORRECTION.

Patent No. 1,849,385.  March 15, 1932.

LEE SEKULSKI.

It is hereby certified that the name of the assignee in the above numbered patent was erroneously written and printed as "Matthews Conveyer Company" whereas said name should have been written and printed as "Mathews Conveyer Company" as shown by the records of assignments in this office; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.